April 15, 1969
M. M. BROWN ET AL
3,438,595
CHALK LINE REEL
Filed Feb. 9, 1967
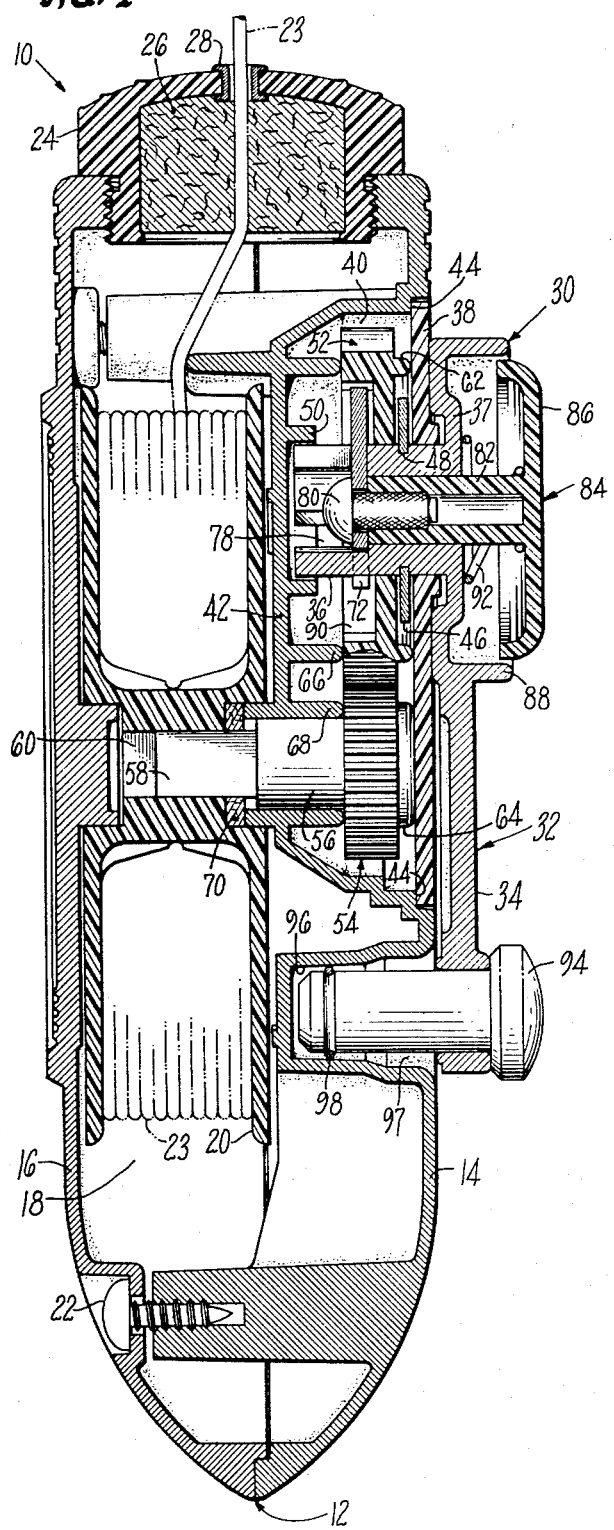
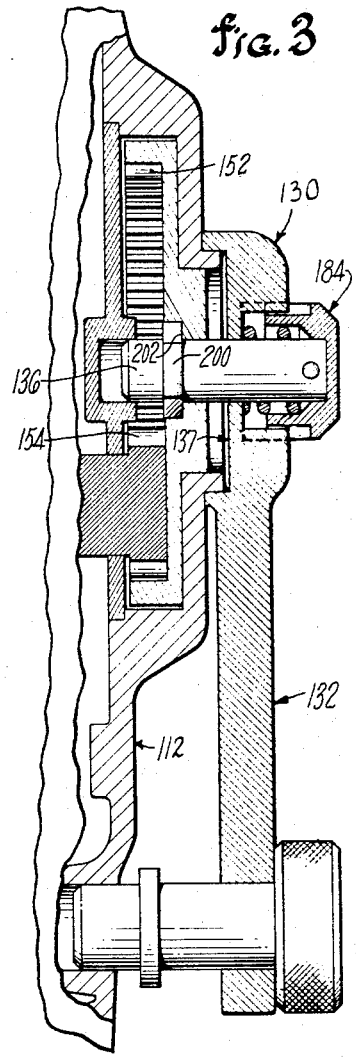
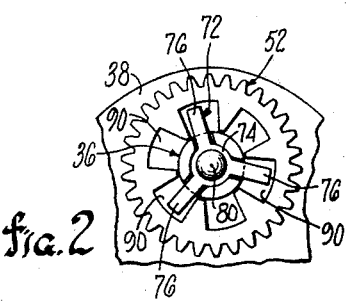
INVENTOR.
MARTIN M. BROWN
FRANK J. KUCHTA
ROBERT F. WEST
BY *Lindsey, Prutzman and Hayes*
ATTORNEYS

United States Patent Office 3,438,595
Patented Apr. 15, 1969

3,438,595
CHALK LINE REEL
Martin M. Brown, Tariffville, Frank J. Kuchta, New Britain, and Robert F. West, Simsbury, Conn., assignors to The Stanley Works, New Britain, Conn., a corporation of Connecticut
Filed Feb. 9, 1967, Ser. No. 614,852
Int. Cl. B65h 75/40
U.S. Cl. 242—96                    10 Claims

ABSTRACT OF THE DISCLOSURE

The apparatus of this invention includes a unitary subassembly for controlling rotation of a chalk line spool journaled in a casing, with the subassembly supported thereon for rotation about an axis in parallel offset relation to the spool axis and having a crank and a push button operated clutch serving to engage and disengage the crank in relation to the spool.

---

The present invention relates to chalk line reels and has as a primary object the provision of an improved chalk line reel incorporating a unitary spool control subassembly for smoothly and easily paying off a chalk line while also providing for length adjustment and locking thereof as well as for rapid rewinding of the chalk line.

Another object of the present invention is to provide a chalk line reel of the above described type which is particularly suited for convenient and economical assembly while permitting independent removal and replacement of either the spool control subassembly or the spool subassembly without disturbing the other.

A further object of the present invention is to provide an improved chalk line reel which is easy to handle and of rugged construction for dependable use over a long service life.

Other objects will be in part obvious and in part pointed out more in detail hereinafter.

The invention accordingly consists in the features of construction, combination of elements and arrangement of parts which is exemplified in the construction hereafter set forth, and the scope of the invention is indicated in the appended claims.

In the drawing:

FIG. 1 is a section view, partly broken away, showing one embodiment of a chalk line reel constructed in accordance with the present invention;

FIG. 2 is a reduced fragmentary view of a clutch mechanism incorporated in the reel of FIG. 1; and FIG. 3 is a section view, partly broken away, showing another embodiment of a spool control subassembly of the present invention.

Referring now to the drawing in detail and particularly to the embodiment of the invention shown in FIG. 1, a chalk line reel 10 is shown with a casing 12 comprising a pair of die cast aluminum case halves 14 and 16 having a plumb bob configuration formed for mating engagement and providing an inner chalk chamber 18 wherein a spool 20 is journaled for rotation. The spool 20 is preferably formed of a tough lightweight material such as high impact or general purpose polystyrenes, and the case halves 14, 16 are removably secured by self tapping screws such as at 22 whereby the spool 20 and its wound line 23 can be readily removed without disturbing other components of the assembly.

A molded plastic cap 24 is screwed into a large open end of casing 12 for easy filling of the chamber 18 with chalk and a felt wiper 26 is fitted within the cap 24 for ensuring that a uniform chalk coating is deposited on line 23 upon its being paid off the spool 20 through a central eyelet 28 fixed in the cap 24.

For controlling rotation of the spool 20, a unitary spool control subassembly 30 having a rotary crank 32 is mounted on the casing 12 on an axis parallel to but offset from the spool axis for rewinding the chalk line 23 as well as providing for freewheeling of the spool 20 for rapidly paying off a preselectable length of line without rotation of the crank 32.

More specifically, the crank 32 is preferably a cast aluminum part shown as having a crank handle 34 and a tubular crankshaft 36 integrally joined in perpendicular relation by an enlarged cup-shaped hub portion 37. The crankshaft 36 extends inwardly through an opening in a plastic cover plate 38 and into a gear housing 40 jointly defined by cover plate 38 and a recessed side wall portion 42 of case half 14. The cover plate 38 fits onto a shoulder 44 flush with the side wall surface of case half 14 surrounding its recessed portion 42 to provide a smoothly contoured body for the casing 12. Screw fasteners, not shown, are provided for removably securing the cover plate 38 to case half 14, and the crank 32 is held in assembled relation to the cover plate 38 by a retaining ring 46 secured adjacent an inside face of the cover plate 38 within a circumferential groove 48 in the crankshaft 36.

An inner axial end of crankshaft 36 is received for rotation within a socket defined by a raised ring 50 projecting outwardly of the recessed side wall portion 42 of the case half 14, and a spur gear 52 is supported for free rotation on the crankshaft 36 in continuous meshing engagement with a pinion 54 having an axially extending hub 56 with a squared end 58 rotatably coupled to the spool 20 within a squared axial opening 60 therein. Both the spur gear 52 and the pinion 54 are preferably molded of nylon to provide a rugged self lubricating drive with the spur gear 52 being of sufficiently enlarged size relative to the pinion 54 to effect rapid rewinding of spool 20.

To provide low friction bearing support while firmly maintaining the gears against axial displacement, raised annular projections 62 and 64 are coaxially formed on the spur gear 52 and pinion 54 for engaging the inside face of the cover plate 38, and a pair of raised rings 66 and 68 are integrally formed on the recessed side wall portion 42 of the case half 14 respectively in concentric relation to the annular projections 62 and 64 for engaging and supporting the spur gear 52 and pinion 54 respectively for rotation within the gear housing 40. The latter is protected from the entry of chalk from the chalk chamber 18 by a felt washer 70 fitted onto the squared end 58 of the pinion 54 such that the gear housing 40 is entirely isolated from the chalk chamber 18. The above described arrangement permits the case halves 14 and 16 to be readily separated if need be since the squared end 58 of the pinion 54 may be easily moved axially of the spool opening 60.

To effect rotation of the spool 20 upon turning the crank 32 as well as for selectively locking the spool, a clutch mechanism is provided as an integral element of the spool control subassembly 30 and includes a spider 72, preferably of steel, formed with a central ring portion 74 received within the axial opening of the tubular crankshaft 36 and a plurality of radial fingers 76 extending outwardly of the central ring portion 74 through a corresponding number of longitudinally extending slots 78 in the inner axial end of the crankshaft 36. Thus, the spider 72 can shift axially of the crankshaft 36 within the slots 78 while being coupled thereto for rotary movement.

In the specific illustrated embodiment of FIG. 1, the spider 72 is fixed by a suitable fastener 80 to an inner end of a tubular shank 82 of a push button 84, the shank 82 being received in the axial opening of the crankshaft 36 for axial shifting movement. As shown in FIG. 1, a head 86 of the push button 84 is concentric to and in closely spaced relation to a surrounding annular rim 88 of the crank hub portion 37 irrespective of the position of the push button 84 for minimizing any possibility of dirt, grit or other undesirable particles being introduced into the gear housing 40.

To rotate the spool 20 in response to rotation of the crank 32, a plurality of equiangularly spaced recesses 90 are formed on the inner face of the spur gear 52 for receiving the radial fingers 76 of the spider 72. In the preferred embodiment, the spider 72 is formed with three equally spaced apart radial fingers 76 for selective positive engagement at relatively small angular increments with the recesses 90, six of which are shown formed in a symmetrical arrangement on the spur gear 52.

The above described clutch mechanism is normally maintained in an engaged position, conditioning the chalk line reel 10 to be rewound upon turning the crank 32, and in this regard, a conical compression spring 92 is coiled about the shank 82 of the push button 84 with opposite ends of the spring 92 bearing against the hub portion 37 of the crank 32 and against the head 86 of the push button 84 whereby the spider 72 is continuously urged toward clutching engagement with the spur gear 52.

In operation, push button 84 is merely depressed to declutch the crank 32 from the spool 20 such that the line may be rapidly paid off without danger of the crank 32 bruising one's knuckles or fingers, and a preselected length of a line has been paid off, the push button 84 can be released to re-engage the clutch mechanism. A molded plastic knob 94 is mounted for axial sliding movement in an aperture in an outer end of the crank handle 34 whereby the knob 94 can be fitted into a socket 96 provided in a runway 97 formed in the case half 14 whereby the crank 32 can be secured against rotation and thus lock spool 20 against rotary movement. A retaining ring 98 is preferably fitted onto the end of knob 94 for close fitting frictional engagement with the side walls of the socket 96 to prevent unintended release of the knob 94 and, if desired, retaining means, not shown, can be provided to hold the knob 94 in an outwardly extended position to prevent intereference with the casing 12 upon turning the crank 32. Further extension of the chalk line 23 is easily provided when the crank handle 34 is locked in position since the push button 84 need only be depressed to release the spool 20 to effect length adjustment of the line whereupon the push button 84 may be released, thereby re-engaging the clutch under the biasing force of the spring 92 to lock the line. Rewinding can be rapidly accomplished upon pulling the knob 94 out of its socket 96 and turning the crank 32 with the clutch engaged, for as previously mentioned pinion 54 is of reduced size relative to the spur gear 52 to provide a stepped-up drive for imparting an angular speed to spool 20 greater than that of the crank 32.

In the embodiment of the invention illustrated in FIG. 3, the same numbers preceded by the numeral 1 are used to identify like parts. In general, the casing 112 and the spool control subassembly 130 are similar to that described in connection with the first embodiment and are similarly assembled. However, in this second embodiment it will be noted that the crankshaft 136 is a solid rod pinned to the push button 184 which is keyed to the hub portion 137 of the crank 132 for axial sliding movement. The crankshaft 136 also includes a hexagonal flange 200 for engaging and disengaging a conforming hexagonal recess 202 centrally formed on the inner face of the spur gear 152. The latter is of enlarged size relative to the pinion 154 as in the previously described embodiment, but the spur gear 152 shown in FIG. 3 is a ring gear in internal contact with the pinion 154 for imparting rotary motion to the spool upon rotation of the crank 132.

A chalk line reel constructed in accordance with the above described invention effects smooth free spooling while providing for length adjustment of the line in a simplified push button operation, and the geared drive to the spool is stepped up to provide a quick return rewind. Moreover, the disclosed separable construction incorporating a unitary spool control subassembly is particularly suited for convenient and economical assembly as well as for quick and easy replacement or substitution of parts.

The embodiments of the invention in which an exclusive property or privilege is claimed are defined as follows:

1. A chalk line reel comprising a casing, a spool journaled for rotation within said casing, a crankshaft supported for rotation in said casing about an axis parallel to but offset from the spool axis, a crank having a hub portion supported on said crankshaft solely for rotary movement about its said axis, said hub portion being in continuous bearing engagement with an exposed outer wall surface of said casing coaxially of said crankshaft, a clutch mechanism including relatively axially displaceable first and second clutch members on said crankshaft permitting free wheeling of said spool independently of said crankshaft when said clutch mechanism is disengaged, an actuating button positioned externally of said casing in fixed relation to one of said first and said second clutch members coaxially of said crankshaft, and a driving connection between said spool and said crankshaft operable when said clutch mechanism is engaged for driving said spool at an angular speed greater than that of said crankshaft for rapid rewinding of said spool.

2. The reel of claim 1 wherein said first clutch member comprises a spur gear supported on said crankshaft for free rotation and having clutch means provided on an inner face of said spur gear, and said second clutch member is coaxial with said spur gear and relatively axially displaceable from said inner face thereof for positive engagement and disengagement with said clutch means.

3. The reel of claim 1 wherein said crankshaft, crank and clutch mechanism constitutes a unitary subassembly removably mounted on said casing.

4. The reel of claim 1 further including a compression spring coiled about said crankshaft with opposite ends of said spring bearing against said hub portion of said crank and said button and continuously biasing the latter outwardly of said casing for releasably holding said first and second clutch members in clutching engagement.

5. The reel of claim 1 wherein said driving connection includes a pinion drivingly connected to said spool in coaxial relation thereto, and wherein the other of said first and second clutch members includes annular toothed gearing in continuous meshing engagement with said pinion.

6. The reel of claim 2 wherein spring means is provided for continuously biasing said second clutch member into positive engagement with said clutch means on said spur gear, and wherein said driving connection comprises a pinion rotatably coupled coaxially to said spool and in continuous meshing engagement with said spur gear.

7. The reel of claim 5 wherein said other clutch member comprises a spur gear in external contact with said pinion.

8. The reel of claim 5 wherein said other clutch member comprises a ring gear in internal contact with said pinion.

9. A chalk line reel comprising a casing, a spool journaled for rotation within said casing, a unitary subassembly for controlling spool rotation including a crank having a crankshaft continuously maintained in perpendicular relation thereto and supported for rotation in said casing about an axis parallel to but offset from the spool axis, said crankshaft being of tubular construction and having an inner end with longitudinally extending slots formed therein, and said subassembly further including a clutch mechanism mounted on said crankshaft and permitting free wheeling of said spool independently of said crankshaft when said clutch mechanism is disengaged, said clutch mechanism including a spur gear supported on said crankshaft for free rotation and having clutch means provided on an inner face of said spure gear, and a spider coaxial with said spur gear and relatively axially displaceable from said inner face thereof, said spider having a central ring portion and a plurality of radial fingers extending outwardly thereof, said central ring portion of said spider being received within said inner end of said crankshaft with said radial fingers projecting through said slots for axial shifting movement relative thereto for selective positive engagement with said clutch means of said spur gear, and a driving connection between said spool and said subassembly operable when said clutch mechanism is engaged for driving said spool at an angular speed greater than that of said crankshaft for rapid rewinding of said spool.

10. The reel of claim 9 wherein said radial fingers of said spider are equally spaced apart in a symmetrical arrangement, and wherein said spur gear includes a plurality of radially directed recesses formed in said inner face thereof in equiangularly spaced relation for selectively receiving said radial fingers of said spider for transmitting torque therebetween.

References Cited

UNITED STATES PATENTS

| | | | |
|---|---|---|---|
| 1,956,806 | 5/1934 | Mitzen et al. | 242—84.8 X |
| 3,090,577 | 5/1963 | Lewandowski | 242—96 |
| 3,311,319 | 3/1967 | Campbell | 242—84.8 X |

FOREIGN PATENTS 957,605  4/1949  France.

WILLIAM S. BURDEN, *Primary Examiner.*

U.S. Cl. X.R.

33—87